US 11,563,218 B2

(12) United States Patent
Kim

(10) Patent No.: US 11,563,218 B2
(45) Date of Patent: Jan. 24, 2023

(54) MANUFACTURING METHOD OF MEMBRANE ELECTRODE ASSEMBLY, MEMBRANE ELECTRODE ASSEMBLY MANUFACTURED THEREBY, AND FUEL CELL COMPRISING MEMBRANE ELECTRODE ASSEMBLY

(71) Applicant: KOLON INDUSTRIES, INC., Seoul (KR)

(72) Inventor: Jung Ho Kim, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 223 days.

(21) Appl. No.: 17/048,238

(22) PCT Filed: Jun. 17, 2019

(86) PCT No.: PCT/KR2019/007261
§ 371 (c)(1),
(2) Date: Oct. 16, 2020

(87) PCT Pub. No.: WO2020/004848
PCT Pub. Date: Jan. 2, 2020

(65) Prior Publication Data
US 2021/0159510 A1 May 27, 2021

(30) Foreign Application Priority Data
Jun. 26, 2018 (KR) .................. 10-2018-0073072

(51) Int. Cl.
*H01M 4/88* (2006.01)
*H01M 8/1004* (2016.01)
*H01M 8/10* (2016.01)

(52) U.S. Cl.
CPC ....... *H01M 4/8892* (2013.01); *H01M 4/8825* (2013.01); *H01M 8/1004* (2013.01);
(Continued)

(58) Field of Classification Search
None
See application file for complete search history.

(56) References Cited

U.S. PATENT DOCUMENTS

| 9,331,340 | B2 | 5/2016 | Toyoshima |
| 2010/0183804 | A1 | 7/2010 | Kim |

(Continued)

FOREIGN PATENT DOCUMENTS

| EP | 2842620 A1 | 3/2015 |
| JP | 05036418 A | 2/1993 |

(Continued)

OTHER PUBLICATIONS

Counterpart EP search report dated Feb. 14, 2022.
KR office action dated Feb. 22, 2022.
Counterpart Japanese office action dated Oct. 26, 2021.

*Primary Examiner* — Sarah A. Slifka
(74) *Attorney, Agent, or Firm* — Harvest IP Law LLP

(57) ABSTRACT

Disclosed are a manufacturing method of a membrane electrode assembly capable of increasing the interfacial adhesion between a polymer electrolyte membrane and a catalyst layer, improving substance delivery and performance, and enhancing hydrogen permeation resistance or oxygen permeability; a membrane electrode assembly manufactured thereby; and a fuel cell comprising the membrane electrode assembly. The manufacturing method of the present invention comprises the steps of: adding a catalyst and a first ionomer to a solvent and dispersing the same, thereby producing a dispersed mixture; adding a second ionomer to the dispersed mixture, thereby producing a coating composition; and applying the coating composition directly onto at least one side of the polymer electrolyte membrane.

12 Claims, 8 Drawing Sheets

(52) U.S. Cl.
CPC ............... *H01M 2008/1095* (2013.01); *H01M 2300/0082* (2013.01)

(56) References Cited

U.S. PATENT DOCUMENTS

| | | |
|---|---|---|
| 2011/0318482 A1 | 12/2011 | Morioka |
| 2013/0157169 A1 | 6/2013 | Madden et al. |
| 2016/0156054 A1 | 6/2016 | Chuy |

FOREIGN PATENT DOCUMENTS

| | | |
|---|---|---|
| JP | 2006142293 A | 6/2006 |
| JP | 2007317658 A | 12/2007 |
| JP | 2011222192 A | 11/2011 |
| JP | 2013134877 A | 7/2013 |
| JP | 2015502630 A | 1/2015 |
| JP | 2015514855 A | 5/2015 |
| JP | 2019530961 A | 10/2019 |
| KR | 1020090051536 A | 5/2009 |
| KR | 101229597 B1 | 2/2013 |
| KR | 20180036212 A | 4/2018 |
| WO | 2018064623 A1 | 4/2018 |

MANUFACTURING METHOD OF MEMBRANE ELECTRODE ASSEMBLY, MEMBRANE ELECTRODE ASSEMBLY MANUFACTURED THEREBY, AND FUEL CELL COMPRISING MEMBRANE ELECTRODE ASSEMBLY

CROSS REFERENCE TO RELATED APPLICATIONS

This application is a National Stage of International Application No. PCT/KR2019/007261 filed Jun. 17, 2019, claiming priority based on Korean Patent Application No. 10-2018-0073072 filed Jun. 26, 2018.

TECHNICAL FIELD

The present disclosure relates to a method of manufacturing a membrane-electrode assembly, a membrane-electrode assembly manufactured using the same, and a fuel cell including the membrane-electrode assembly, and more particularly to a method of manufacturing a membrane-electrode assembly that is capable of improving interfacial binding strength between a polymer electrolyte membrane and a catalyst layer while using a direct coating method, a membrane-electrode assembly manufactured using the same, and a fuel cell including the membrane-electrode assembly.

BACKGROUND ART

A fuel cell is a power generation system for directly converting chemical reaction energy of hydrogen and oxygen contained in a hydrocarbon-based material, such as methanol, ethanol, or natural gas, into electrical energy. A representative example of such a fuel cell is a polymer electrolyte membrane fuel cell (PEMFC). The PEMFC has attracted attention as a next-generation energy source, and particularly in a vehicle-related field, research has been actively conducted to commercialize the PEMFC due to advantages thereof, such as environmental friendliness.

In a fuel cell system, a membrane-electrode assembly (MEA), which substantially generates electricity, has a structure in which an anode electrode (also referred to as a "fuel electrode" or an "oxidation electrode") and a cathode electrode (also referred to as an "air electrode" or a "reduction electrode") are disposed in the state in which a polymer electrolyte membrane including a proton conductive polymer is interposed therebetween.

A composition for formation of each electrode includes a catalyst, an ionomer, a solvent, and an additive. Among the above-mentioned ingredients, the catalyst is a principal factor that determines the activation and durability of the fuel cell. A Pt/C catalyst, in which a carbon support having a large specific surface area and high electrical conductivity is impregnated with platinum nanoparticles, is most widely used as a platinum-based catalyst for the oxidation electrode (the anode electrode) and the reduction electrode (the cathode electrode). However, the Pt/C catalyst is produced using pure platinum, which is an expensive metal, whereby it is difficult to reduce the price of the catalyst. In addition, oxygen is adsorbed on the surface of platinum due to an oxygen reduction reaction at the reduction electrode, whereby platinum oxide is generated. At this time, overvoltage occurs, and therefore a considerable amount of energy is lost. For this reason, commercialization of the fuel cell has been delayed.

Meanwhile, among various techniques that have been developed in order to commercialize the fuel cell, a direct coating technique, which is a technique of directly coating an electrode on a polymer electrolyte membrane, has attracted attention as a new MEA manufacturing technique for commercializing the fuel cell. Representative examples of the direct coating technique include slot die coating and spray coating.

In order to effectively realize direct coating, however, it is essential not only to develop a technique of processing a polymer electrolyte membrane but also to develop an electrode composition for direct coating that is capable of improving interfacial binding strength between the polymer electrolyte membrane and the electrode.

DISCLOSURE

Technical Problem

It is an object of the present disclosure to provide a method of manufacturing a membrane-electrode assembly that is capable of improving interfacial binding strength between a polymer electrolyte membrane and a catalyst layer utilizing a free ionomer at the time of using a direct coating method, that is capable of improving ability to transfer materials, such as fuel, air, and generated water, and the output performance of a fuel cell, and that is capable of improving the resistance to hydrogen permeation or oxygen permeability of the membrane-electrode assembly.

It is another object of the present disclosure to provide a membrane-electrode assembly manufactured using the method of manufacturing the membrane-electrode assembly.

It is a further object of the present disclosure to provide a fuel cell including the membrane-electrode assembly.

Technical Solution

In accordance with an aspect of the present disclosure, there is provided a method of manufacturing a membrane-electrode assembly, the method including adding a catalyst and a first ionomer to a solvent and then dispersing the catalyst and the first ionomer in order to prepare a dispersed mixture, at least a portion of the first ionomer being coated on the surface of the catalyst, adding a second ionomer to the dispersed mixture in order to prepare a coating composition, and directly coating the coating composition on at least one surface of a polymer electrolyte membrane.

The first and second ionomers may be identical to or different from each other.

Each of the first and second ionomers may have an equivalent weight (EW) ranging from 600 g/eq to 1100 g/eq, and the equivalent weight of the first ionomer may be different from the equivalent weight of the second ionomer.

Each of the first and second ionomers may be a fluorinated polymer including a fluorinated carbon backbone and a side chain expressed by Chemical Formula 1 below, and the first and second ionomers may have different side-chain lengths (a+b).

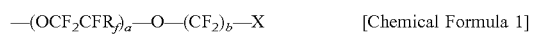

(In Chemical Formula 1 above, $R_f$ is independently any one selected from the group consisting of F, Cl, and a perfluorinated alkyl group having a carbon number ranging from 1 to 10, X is an ion exchange group, a is an integer ranging from 0 to 3, and b is an integer ranging from 1 to 5.)

The first ionomer may be a first hydrocarbon-based ionomer, the second ionomer may be a second hydrocarbon-based ionomer, and the first hydrocarbon-based ionomer may be different from the second hydrocarbon-based ionomer.

One of the first and second ionomers may be a fluorine-based ionomer, and the other may be a hydrocarbon-based ionomer.

The second ionomer may have a size ranging from 10 nm to 1500 nm.

The second ionomer may have any one selected from the group consisting of a spherical shape, an ellipsoidal shape, a stick shape, and a coil shape.

The coating composition may be prepared by adding at least one functional additive, selected from the group consisting of a radical scavenger, an ionic conductor, an oxygen evolution reaction (OER) catalyst, and a gas barrier particle, to the dispersed mixture together with the second ionomer.

The coating composition may include 20 wt % to 40 wt % of the first ionomer and 0.2 wt % to 7 wt % of the second ionomer based on the total weight of the coating composition.

At least a portion of the second ionomer may not be coated on the surface of the catalyst.

The step of manufacturing the coating composition may further include dispersing the second ionomer added to the dispersed mixture.

The second ionomer may be dispersed at a temperature of 15° C. to 80° C.

The method may further include drying the coating composition coated on the at least one surface of the polymer electrolyte membrane, wherein, at the drying step, a free ionomer, which is not coated on the surface of the catalyst, may be precipitated toward the polymer electrolyte membrane in order to form an ionomer-rich layer, and the free ionomer may include at least one of the first and second ionomers.

In accordance with another aspect of the present disclosure, there is provided a membrane-electrode assembly including a polymer electrolyte membrane and a catalyst layer disposed on at least one surface of the polymer electrolyte membrane, wherein the catalyst layer includes a catalyst, a coating ionomer disposed on the surface of the catalyst, and a free ionomer, which is not coated on the surface of the catalyst, the catalyst layer includes a first layer abutting the polymer electrolyte membrane and a second layer on the first layer, and the first layer is an ionomer-rich layer including the free ionomer.

The second layer may not include the free ionomer, or may include the free ionomer in a smaller amount per unit volume than the first layer.

The coating ionomer and the free ionomer may be different kinds of ionomers.

The free ionomer may have any one selected from the group consisting of a spherical shape, an ellipsoidal shape, a stick shape, and a coil shape.

The ionomer-rich layer may include at least one functional additive selected from the group consisting of a radical scavenger, an ionic conductor, an oxygen evolution reaction (OER) catalyst, and a gas barrier particle.

The ionomer-rich layer may have a thickness ranging from 30 nm to 1500 nm.

In accordance with a further aspect of the present disclosure, there is provided a fuel cell including the membrane-electrode assembly.

Advantageous Effects

In the method of manufacturing a membrane-electrode assembly according to the present disclosure, a direct coating method is used. Consequently, no decal film is required, whereby processing time necessary to coat the decal film and material cost may be reduced. In addition, no transferring process is required, whereby processability and economy may be secured.

Also, in the method of manufacturing the membrane-electrode assembly according to the present disclosure, it is possible to improve interfacial binding strength between a polymer electrolyte membrane and a catalyst layer, to improve mass transfer and performance, and to improve resistance to hydrogen permeation or oxygen permeability utilizing a free ionomer at the time of using the direct coating method.

BEST MODE

Figure 1:
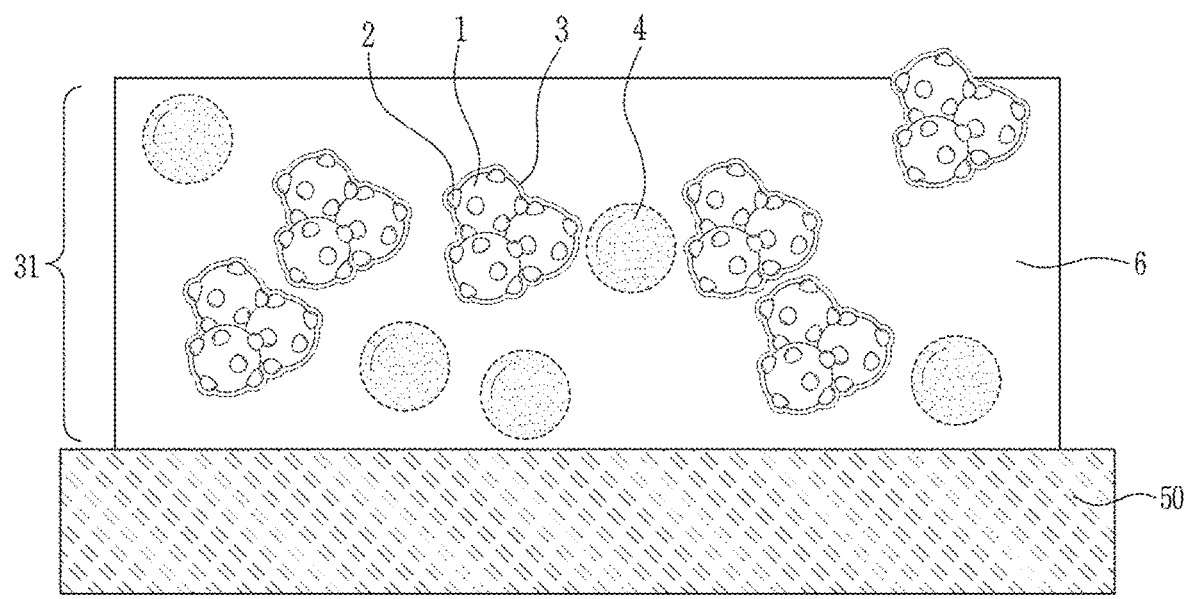
FIG. 1 is a view schematically showing the state in which a coating composition according to an embodiment of the present disclosure is coated on a polymer electrolyte membrane but is not yet dried.

Hereinafter, embodiments of the present disclosure will be described in detail. However, the embodiments of the present disclosure are provided merely for illustration, and the present disclosure is not limited thereto. The present disclosure is defined only by the category of the appended claims.

Unless particularly mentioned in this specification, it will be understood that, when an element such as a layer, film, region, or substrate is referred to as being "on" another element, it may be "directly on" the other element or an intervening element may also be present.

A method of manufacturing a membrane-electrode assembly according to an embodiment of the present disclosure includes a step of adding a catalyst and a first ionomer to a solvent and then dispersing the catalyst and the first ionomer in order to prepare a dispersed mixture (at this time, at least a portion of the first ionomer is coated on the surface of the catalyst), a step of adding a second ionomer to the dispersed mixture in order to prepare a coating composition, and a step of directly coating the coating composition on at least one surface of a polymer electrolyte membrane.

First, the catalyst and the first ionomer are added to the solvent and are then dispersed in order to prepare the dispersed mixture.

Any catalyst may be used as long as the catalyst is usable in a hydrogen oxidation reaction and/or an oxygen reduction reaction. Preferably, a platinum-based metal and/or a non-platinum-based metal is used as the catalyst. Platinum (Pt) and a Pt-M alloy (M being at least one selected from the group consisting of palladium (Pd), ruthenium (Ru), iridium (Ir), osmium (Os), gallium (Ga), titanium (Ti), vanadium (V), chrome (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)) may be used as the platinum-based metal.

At least one selected from the group consisting of palladium (Pd), ruthenium (Ru), iridium (Ir), osmium (Os), and a non-platinum alloy may be used as the non-platinum-based metal.

Specifically, Pt—Pd, Pt—Sn, Pt—Mo, Pt—Cr, Pt—W, Pt—Ru, Pt—Ni, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, or a mixture of two or more thereof may be used as the Pt-M alloy.

In addition, Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, Fe—N, Fe—P, Co—N, or a mixture of two or more thereof may be used as the non-platinum alloy.

In addition, the catalyst may be used as a metal (black) alone, or may be used in the state in which a carrier is impregnated with a catalyst metal.

The carrier may be (i) a carbon-based carrier, (ii) porous inorganic oxide, such as zirconia, alumina, titania, silica, or ceria, or (iii) zeolite. The carbon-based carrier may be selected from among graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a combination of one or more thereof. However, the present disclosure is not limited thereto. Any carrier that is available in the relevant technical field may be used without limitation.

The catalyst particles may be located on the surface of the carrier, or may permeate into the carrier while filling pores in the carrier.

In the case in which a noble metal impregnated in the carrier is used as the catalyst, a commercially available catalyst may be used, or the carrier may be impregnated with the noble metal in order to produce the catalyst. The process of impregnating the carrier with the noble metal is well-known in the art to which the present disclosure pertains, and therefore a detailed description thereof will be omitted in this specification.

The catalyst may be included in the coating composition so as to account for 20 wt % to 80 wt % of the total weight of the catalyst layer. If the content of the catalyst is less than 20 wt % of the total weight of the catalyst layer, catalyst activation required for an electrode may not be satisfied. If the content of the catalyst is greater than 80 wt %, the activation area may be decreased due to cohesion of the catalyst, whereby catalyst activation may be deteriorated.

The coating composition includes the first ionomer in order to improve the adhesive force of the catalyst and to transfer hydrogen ions. The first ionomer may be a fluorine-based ionomer, a hydrocarbon-based ionomer, or a mixture thereof.

The fluorine-based ionomer is (i) a fluorine-based polymer including fluorine in the main chain thereof or (ii) a partially fluorinated polymer, such as a polystyrene-graft-ethylene tetrafluoroethylene copolymer or a polystyrene-graft-polytetrafluoroethylene copolymer, each of which has a cation exchange group or an anion exchange group.

The cation exchange group is a functional group that is capable of transferring cations, such as protons, and may be an acid group, such as a sulfonic acid group, a carboxyl group, a boronic acid group, a phosphate group, an imide group, a sulfonimide group, or a sulfonamide group. In general, the cation exchange group may be a sulfonic acid group or a carboxyl group.

The anion exchange group is a functional group that is capable of transferring anions, such as hydroxyl ions, carbonate ions, or bicarbonate ions.

Examples of the fluorine-based ionomer include, but are not limited to, (i) poly(perfluorosulfonic acid), (ii) poly(perfluorocarboxylic acid), (iii) a copolymer of tetrafluoroethylene and fluoro vinyl ether including a sulfonic acid group, and (iv) defluorinated polyetherketone sulfide.

The fluorine-based ionomer may be used either alone or in a combination of two or more materials.

The hydrocarbon-based ionomer is a hydrocarbon-based polymer having a cation exchange group or an anion exchange group (for example, a hydrocarbon-based polymer including at least one selected from the group consisting of imidazole, benzimidazole, polyamide, polyamide imide, polyimide, polyacetal, polyethylene, polypropylene, acrylic resin, polyester, polysulfone, polyether, polyether imide, polyester, polyether sulfone, polyether imide, polycarbonate, polystyrene, polyphenylene sulfide, polyether ether ketone, polyether ketone, polyaryl ether sulfone, polyphosphazene, and polyphenyl quinoxaline in the main chain thereof).

Examples of the hydrocarbon-based ionomer include, but are not limited to, sulfonated polyimide (S—PI), sulfonated polyarylether sulfone (S-PAES), sulfonated polyetheretherketone (SPEEK), sulfonated polybenzimidazole (SPBI), sulfonated polysulfone (S—PSU), sulfonated polystyrene (S—PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, and sulfonated polyarylene ether sulfone ketone.

The hydrocarbon-based ionomer may be used either alone or in a combination of two or more materials.

Optionally, the first ionomer may be used together with a binder, such as a non-conductive compound, in order to further increase the force of adhesion with the polymer electrolyte membrane. Preferably, the amount of the binder that is used is adjusted for the purpose thereof.

At least one selected from the group consisting of polytetrafluoroethylene (PTFE), a tetrafluoroethylene-hexafluoropropylene copolymer (FEP), a tetrafluoroethylene-perfluoroalkyl vinyl ether copolymer (PFA), ethylene/tetrafluoroethylene (ETFE), an ethylene chlorotrifluoroethylene copolymer (ECTFE), polyvinylidene fluoride, a polyvinylidene fluoride-hexafluoropropylene copolymer (PVdF-HFP), dodecylbenzenesulfonic acid, and sorbitol may be used as the non-conductive compound.

The binder may be included in a composition for formation of the catalyst layer so as to account for less than 20 wt % of the total weight of the catalyst layer. If the content of the binder is greater than 20 wt % of the total weight of the catalyst layer, ion conductivity may be decreased, whereby the performance of a fuel cell may be deteriorated.

The solvent may be selected from the group consisting of water, a hydrophilic solvent, an organic solvent, and a mixture of two or more thereof.

The hydrophilic solvent may include straight-chain or branched-chain saturated or unsaturated hydrocarbon having 1 to 12 carbon atoms as a main chain thereof and have at least one functional group selected from the group consisting of alcohol, ketone, aldehyde, carbonate, carboxylate, carboxylic acid, ether, and amide. The hydrophilic solvent may include an aliphatic or aromatic cyclic compound as at least a part of the main chain. For example, the alcohol may be methanol, ethanol, isopropyl alcohol, ethoxyethanol, n-propyl alcohol, butyl alcohol, 1,2-propanediol, 1-pentanol, 1,5-pentanediol, or 1,9-nonanediol, the ketone may be heptanone or octanone, the aldehyde may be benzaldehyde or tolualdehyde, the ester may be methyl pentanoate or ethyl 2-hydroxy propanoate, the carboxylic acid may be pentanoic acid or heptanoic acid, the ether may be methoxybenzene or dimethoxypropane, and the amide may be propanamide, butyramide, or dimethylacetamide.

The organic solvent may be selected from N-methylpyrrolidone, dimethyl sulfoxide, tetrahydrofuran, and a mixture of two or more thereof.

The solvent may be included so as to account for 80 to 95 wt % of the total weight of the coating composition. If the content of the solvent is less than 80 wt %, the solid content is too high, whereby the catalyst layer may be cracked at the time of forming the catalyst layer, and dispersion may not be sufficiently achieved due to the high viscosity thereof. If the content of the solvent is greater than 95 wt %, activation of the catalyst layer may be adversely affected.

After the catalyst and the first ionomer are added to the solvent, the catalyst and the first ionomer are dispersed such that at least a portion of the first ionomer is coated on the surface of the catalyst.

Any dispersion method may be used, as long as the dispersion method is capable of coating the first ionomer on the surface of the catalyst. For example, any one selected from the group consisting of a homogenizer, a nano disperser, a ball mill, a powder mixer, and a resonant acoustic mixer may be used.

Subsequently, a second ionomer is added to the dispersed mixture in order to prepare a coating composition. After the dispersed mixture is prepared, the second ionomer is added to the dispersed mixture, whereby it is possible to more effectively precipitate the second ionomer in a subsequent drying process, and it is possible to form an ionomer-rich layer that is adjacent to the polymer electrolyte membrane. The kind, content, and size of the second ionomer may be adjusted in order to more effectively form the ionomer-rich layer.

The second ionomer may be the same as or different from the first ionomer. In the case in which the same material as the first ionomer is used as the second ionomer, a concrete example of the second ionomer is identical to what has been described in connection with the first ionomer, and a duplicate description thereof will be omitted.

In an example in which the second ionomer and the first ionomer are different from each other, the first ionomer and the second ionomer may have different equivalent weights (EWs).

Specifically, each of the first and second ionomers may have an equivalent weight ranging from 600 g/eq to 1100 g/eq, and the equivalent weight of the first ionomer may be different from the equivalent weight of the second ionomer.

In another example in which the second ionomer and the first ionomer are different from each other, the first ionomer and the second ionomer may have different side-chain lengths.

Specifically, each of the first and second ionomers may be a fluorinated polymer including a fluorinated carbon backbone and a side chain expressed by Chemical Formula 1 below. At this time, the first and second ionomers may be different from each other in terms of the side-chain length defined by the sum of "a" and "b" (i.e. a+b) in Chemical Formula 1 below.

$$-(OCF_2CFR_f)_a-O-(CF_2)_b-X \qquad \text{[Chemical Formula 1]}$$

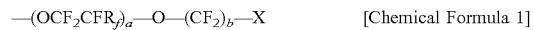

In Chemical Formula 1 above, $R_f$ may be any one selected from the group consisting of F, Cl, and a perfluorinated alkyl group having 1 to 10 carbon atoms, specifically F.

X may be an ion exchange group, specifically a cation exchange group selected from the group of a sulfonic acid group, a carboxyl group, a boronic acid group, a phosphate group, an imide group, a sulfonimide group, and a sulfonamide group, more specifically a sulfonic acid group or a carboxyl group.

a may be an integer ranging from 0 to 3, and b may be an integer ranging from 1 to 5.

In another example in which the second ionomer and the first ionomer are different from each other, the first ionomer may be a first hydrocarbon-based ionomer, the second ionomer may be a second hydrocarbon-based ionomer, and the first hydrocarbon-based ionomer may be different from the second hydrocarbon-based ionomer. For example, sulfonated polyarylether sulfone may be used as the first ionomer, and sulfonated polyetheretherketone may be used as the second ionomer.

In a further example in which the second ionomer and the first ionomer are different from each other, one of the first and second ionomers may be a fluorine-based ionomer, and the other may be a hydrocarbon-based ionomer.

The size of the second ionomer may be 10 nm to 1500 nm, specifically 30 nm to 800 nm. In the case in which the size of the second ionomer deviates from the above range, mass transfer may be impeded, or it may be difficult to adjust the position at which the ionomer-rich layer is generated.

The shape of the second ionomer may be any one selected from the group consisting of a spherical shape, an ellipsoidal shape, a stick shape, and a coil shape. More preferably, the second ionomer has an ellipsoidal shape or a stick shape in order to improve mass transfer efficiency and ion conductivity.

The size and shape of the second ionomer may be adjusted by changing the composition, temperature, and dispersion of the solvent.

Meanwhile, the coating composition may be prepared by adding a functional additive to the dispersed mixture together with the second ionomer. For example, a mixture of the second ionomer and the functional additive may be added to the dispersed mixture in order to prepare the coating composition. The functional additive may improve the resistance to hydrogen permeation or oxygen permeability of the membrane-electrode assembly.

The functional additive may be any one selected from the group consisting of a radical scavenger, an ionic conductor, an oxygen evolution reaction (OER) catalyst, a gas barrier particle, and a mixture thereof.

The radical scavenger may be uniformly dispersed in the ionomer-rich layer (more specifically, in the second ionomer in the ionomer-rich layer) in order to stabilize the membrane-electrode assembly. The radical scavenger is a transition metal ion that is capable of decomposing hydrogen peroxide into water and oxygen in order to inhibit the generation of a hydroxyl radical. Specifically, the radical scavenger may be cerium, tungsten, ruthenium, palladium, silver, rhodium, cerium, zirconium, yttrium, manganese, molybdenum, lead, vanadium, or titanium. The radical scavenger may be used as a metal alone, or may be used in an ion form thereof, an oxide form thereof, a salt form thereof, or any other form thereof.

More specifically, the radical scavenger may be any one selected from the group of $CeO_2$, $MnO_2$, $CsO_2$, $ZrO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, Co-porphyrin, and a mixture thereof, and a mixture or a compound constituted by one or more thereof may be used.

The ionic conductor may improve the hydrogen ion conductivity of the membrane-electrode assembly, since the ionic conductor exhibits high dispersibility. The ionic conductor may be a hydrophilic inorganic additive. Specifically, the ionic conductor may be any one selected from the group consisting of $SnO_2$, silica, alumina, zirconia, mica, zeolite, phosphotungstic acid, silicon tungstic acid, zirconium hydrogen phosphate, and a mixture thereof. The ionic conductor, which is a hydrophilic inorganic ion additive, may prevent a decrease in hydrogen ion conductivity under a high-temperature and low-humidity condition.

The oxygen evolution reaction catalyst may be atomized/uniformly dispersed in the catalyst layer in order to improve the durability of the catalyst layer through an effective water decomposition reaction. The oxygen evolution reaction catalyst may include an active material made of a platinum-based metal and/or a non-platinum-based metal.

The platinum-based metal may be platinum or a platinum alloy. Examples of the platinum alloy include, but are not limited to, Pt—Pd, Pt—Sn, Pt—Mo, Pt—Cr, Pt—W, Pt—Ru, Pt—Ni, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, and Pt—Cr—Ir.

The non-platinum-based metal may be gold, palladium, rhodium, iridium, ruthenium, osmium, or a non-platinum alloy. Examples of the non-platinum alloy include, but are not limited to, Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, Fe—N, Fe—P, and Co—N.

In addition, the oxygen evolution reaction catalyst may be used as a metal (black) alone, or may be used in the state in which a carrier is impregnated with a catalyst metal. The carrier may be a carbon-based carrier or a porous inorganic oxide carrier such as zirconia, alumina, titania, silica, ceria, ITO, WO, $SnO_2$, or $ZnO_2$. The carbon-based carrier may be any one selected from the group consisting of graphite, carbon fiber, carbon sheet, carbon black, acetylene black, Ketjen black, fullerene, carbon nanotube, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a mixture thereof.

The gas barrier particle may be any one selected from the group consisting of clay, montmorillonite, saponite, laponite, mica, fluorohectorite, kaolinite, vermiculite, and a mixture thereof.

The functional additive may have an average particle size of 1 nm to 100 nm. For example, the functional additive may be nanoparticles having an average particle size of 2 nm to 35 nm. In the case in which the size of the functional additive is within the above range, the functional additive may be uniformly dispersed in the second ionomer, whereby it is possible to realize the membrane-electrode assembly without a great increase in resistance. In the case in which the average particle size of the functional additive deviates from the above range, components of the functional additive may cohere, or the functional additive may be insufficiently dispersed in the second ionomer, whereby phase separation may occur.

When the mixture of the second ionomer and the functional additive is added to the dispersed mixture, the mixture added to the dispersed mixture may include 0.1 wt % to 30 wt % of the functional additive, more specifically 0.5 wt % to 15 wt % of the functional additive, based on the total weight of the mixture. In the case in which the content of the functional additive is within the above range, the functional additive may be uniformly included in the second ionomer without phase separation. In the case in which the content of the functional additive is less than 0.1 wt %, it may be difficult to achieve the effect expected from the additive. In the case in which the content of the functional additive is greater than 30 wt %, the dispersibility of the functional additive may be decreased, whereby hydrogen ion conductivity may be decreased, ionic resistance may be increased, charge transfer resistance may be increased, mass transfer resistance may be increased, and water may be nonuniformly decomposed in a high-temperature and low-humidity condition. As a result, it may not be possible to improve the output performance and durability of the membrane-electrode assembly.

The coating composition may include 20 wt % to 40 wt % of the first ionomer and 0.2 wt % to 7 wt % of the second ionomer, more specifically 25 wt % to 35 wt % of the first ionomer and 0.5 wt % to 4 wt % of the second ionomer, based on the total weight of the coating composition. In the case in which the content of the first ionomer is less than 20 wt %, ion transfer may not be effectively performed, whereby the performance of the membrane-electrode assembly may be deteriorated. In the case in which the content of the first ionomer is greater than 40 wt %, the transfer of a reactant and a product may be impeded. In the case in which the content of the second ionomer is less than 0.2 wt % of the total weight of the composition for formation of the catalyst layer, an improvement through the introduction of the second ionomer may be insignificant. In the case in which the content of the second ionomer is greater than 5 wt % of the total weight of the composition for formation of the catalyst layer, mass transfer may be impeded.

Optionally, the residual of the first ionomer that is present in the dispersed mixture without being coated on the surface of the catalyst may be removed before the second ionomer is added to the dispersed mixture.

The step of preparing the coating composition may further include a step of dispersing the second ionomer added to the dispersed mixture.

The second ionomer may be dispersed, for example, using any one selected from the group consisting of a homogenizer, a nano disperser, a ball mill, a powder mixer, and a resonant acoustic mixer.

According to the present disclosure, the possibility of the second ionomer being coated on the surface of the catalyst or on the first ionomer coated on the surface of the catalyst is low since the force of binding between the first ionomer and the second ionomer is lower than the force of binding between the catalyst and the first ionomer. In the case in which the second ionomer is added to the solvent together with the catalyst and the first ionomer, however, the possibility of a thick ionomer layer including the first and second ionomers being formed on the surface of the catalyst is high (i.e. the possibility of the ionomer-rich layer being formed is low), whereby it may not be possible to expect an improvement in the performance of the membrane-electrode assembly. Furthermore, activation of the catalyst may be decreased due to the thick ionomer layer, whereby the performance of the membrane-electrode assembly may be deteriorated.

The second ionomer added to the dispersed mixture may be dispersed at a temperature of 15° C. to 80° C., specifically 15° C. to 70° C. In the case in which the dispersion temperature exceeds 70° C., dispersibility may be lowered due to binding between ionomer components. A cooling jacket or the like may be used in order to control the increase in temperature during the dispersion process.

Subsequently, the coating composition is directly coated on at least one surface of the polymer electrolyte membrane.

The polymer electrolyte membrane includes an ionic conductor. The ionic conductor may be a cationic conductor having a cation exchange group that is capable of transferring cations, such as protons, or an anionic conductor having an anion exchange group that is capable of transferring anions, such as hydroxyl ions, carbonate ions, or bicarbonate ions.

The cation exchange group may be any one selected from the group consisting of a sulfonic acid group, a carboxyl group, a boronic acid group, a phosphate group, an imide group, a sulfonimide group, a sulfonamide group, and a combination thereof. In general, the cation exchange group may be a sulfonic acid group or a carboxyl group.

The cationic conductor may be (i) a fluorine-based polymer including fluorine in the main chain thereof, (ii) a hydrocarbon-based polymer, such as benzimidazole, polyamide, polyamide imide, polyimide, polyacetal, polyethylene, polypropylene, acrylic resin, polyester, polysulfone, polyether, polyether imide, polyester, polyether sulfone, polyether imide, polycarbonate, polystyrene, polyphenylene sulfide, polyether ether ketone, polyether ketone, polyaryl ether sulfone, polyphosphazene, or polyphenyl quinoxaline, (iii) a partially fluorinated polymer, such as a polystyrene-graft-ethylene tetrafluoroethylene copolymer or a polystyrene-graft-polytetrafluoroethylene copolymer, or (iv) sulfone imide, each of which includes the cation exchange group.

More specifically, in the case in which the cationic conductor is a proton conductor, the cationic conductor may include a cation exchange group selected from the group consisting of a sulfonic acid group, a carboxyl group, a phosphate group, a phosphonic acid group, and a derivative thereof in the side chain thereof. For example, the cationic conductor may be, but is not limited to, (i) a fluorine-based polymer including poly(perfluorosulfonic acid), poly(perfluorocarboxylic acid), a copolymer of tetrafluoroethylene and fluoro vinyl ether including a sulfonic acid group, defluorinated polyetherketone sulfide, and a mixture of two or more thereof, or (ii) a hydrocarbon-based polymer including sulfonated polyimide (S—PI), sulfonated polyarylether sulfone (S-PAES), sulfonated polyetheretherketone (SPEEK), sulfonated polybenzimidazole (SPBI), sulfonated polysulfone (S—PSU), sulfonated polystyrene (S—PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or a mixture of two or more thereof.

The anionic conductor is a polymer capable of transporting anions, such as hydroxyl ions, carbonate, or bicarbonate. The anionic conductor is commercially available in the form of hydroxide or halide (generally chloride), and the anionic conductor may be used in an industrial water purification, metal separation, or catalyst process.

A polymer doped with metal hydroxide may generally be used as the anionic conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), doped with metal hydroxide, may generally be used as the anionic conductor.

Meanwhile, the polymer electrolyte membrane may be a reinforcement membrane configured to have a structure in which pores in a fluorine-based porous support, such as e-PTFE, or a porous support, such as a porous nanoweb support formed by electrospinning, etc., are filled with the ionic conductor.

The coating composition is coated on at least one surface of the polymer electrolyte membrane. In the method of manufacturing the membrane-electrode assembly, a direct coating method is used. Consequently, no decal film is required, whereby processing time necessary to coat the decal film and material cost may be reduced. In addition, no transferring process is required, whereby processability and economy may be secured.

Meanwhile, in the case in which the coating composition is directly coated on only one surface of the polymer electrolyte membrane in order to form a catalyst layer, the catalyst layer may be formed on the other surface of the polymer electrolyte membrane using a method other than the direct coating method, for example, a catalyst coated substrate (CCS) method or a catalyst coated membrane (CCM) method.

When the coating composition is directly coated on the polymer electrolyte membrane, the coating composition, in which the catalyst is dispersed, may be continuously or intermittently transported to a coater, which may uniformly coat the coating composition on the polymer electrolyte membrane so as to have a predetermined thickness.

For example, the coating composition may be continuously transported to a coater, such as a die coater, a gravure coater, a bar coater, or a comma coater, which may coat the coating composition using slot-die coating, bar coating, comma coating, screen printing, spray coating, doctor blade coating, brush coating, etc.

In the method of manufacturing the membrane-electrode assembly according to the present disclosure, it is possible to improve interfacial binding strength between the polymer electrolyte membrane and the catalyst layer, to improve mass transfer and performance, and to improve resistance to hydrogen permeation or oxygen permeability as the result of utilizing a free ionomer.

In an embodiment of the present disclosure, the method of manufacturing the membrane-electrode assembly may further include a step of drying the coating composition coated on at least one surface of the polymer electrolyte membrane. At the drying step, the ionomer that is not coated on the surface of the catalyst (i.e. a "free ionomer") may be precipitated toward the polymer electrolyte membrane in order to form an ionomer-rich layer. The free ionomer may include at least one of the first and second ionomers, for example, either the second ionomer alone or both the first ionomer and the second ionomer.

Various drying methods, such as a hot-air drying method, a vacuum drying method, and an infrared (IR) drying method, may be used at the drying step. Drying temperature and time may be appropriately adjusted depending on the boiling point (BP) of the solvent that is used. Specifically, the drying step may be performed at 80° C. to 120° C. for 0.3 minutes to 30 minutes. In the case in which the drying temperature is lower than 80° C. or in the case in which the drying time is less than 0.3 minutes, it may not be possible to form a sufficiently dried catalyst layer. In the case in which the drying temperature is higher than 120° C. or in the case in which the drying time is greater than 30 minutes, the processing time may be unnecessarily increased, and the catalyst layer may crack.

Figure 2:
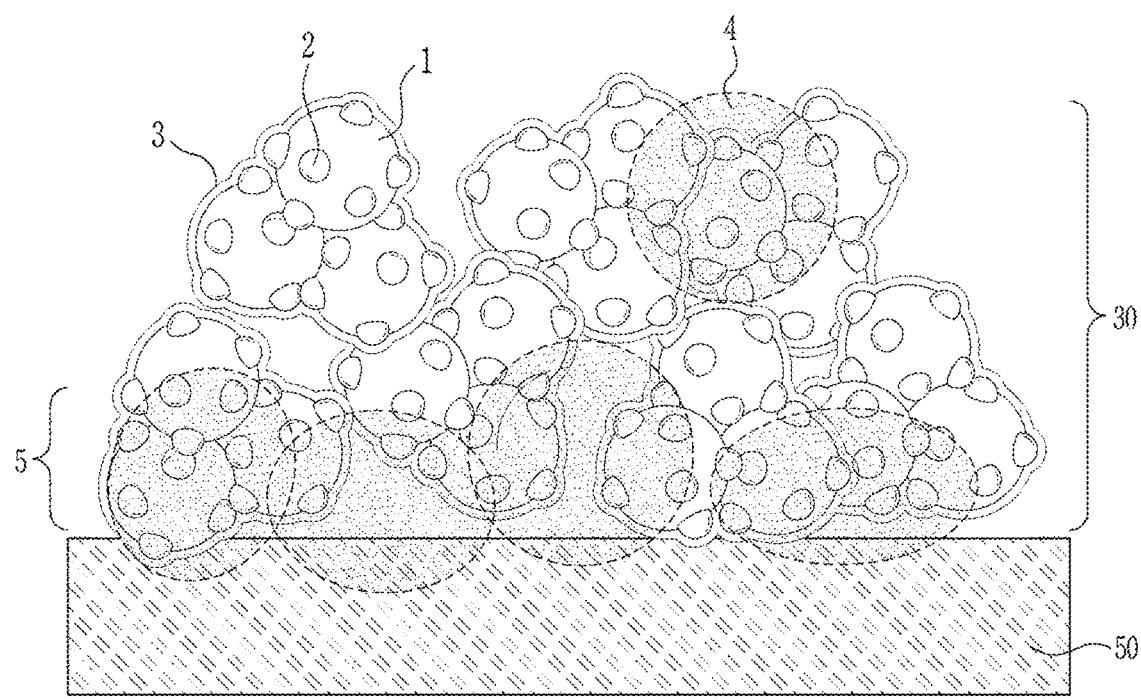
FIG. 2 is a view schematically showing the state in which the coating composition according to the embodiment of the present disclosure is coated on the polymer electrolyte membrane and is then dried in order to form a catalyst layer.

FIG. 1 is a view schematically showing the state in which a coating composition according to an embodiment of the present disclosure is coated on a polymer electrolyte membrane but is not yet dried, and FIG. 2 is a view schematically showing the state in which the coating composition according to the embodiment of the present disclosure is coated on the polymer electrolyte membrane and is then dried in order to form a catalyst layer.

Referring to FIG. 1, the coating composition 31 coated on the polymer electrolyte membrane 50 is configured to have a structure in which a catalyst 2 coated with a coating ionomer (e.g. the first ionomer) 3 and a free ionomer (e.g. the second ionomer) 4 are dispersed in the solvent 6. At this time, the carrier 1 is impregnated with the catalyst 2, the coating ionomer 3 is coated on both the carrier 1 and the catalyst 2, and the free ionomer 4 is homogeneously distributed in the solvent 6.

Referring to FIG. 2, after the drying process is performed, the free ionomer 4 is precipitated toward the polymer electrolyte membrane 50 in order to form an ionomer-rich layer 5. At this time, the free ionomer 4 may be located not only in the ionomer-rich layer 5, but may also be located between catalyst components 2 on the ionomer-rich layer 5. At this time, the free ionomer 4 includes any one selected from the group consisting of the first ionomer that is not coated on the surface of the catalyst 2, the second ionomer that is not coated on the surface of the catalyst 2, and a combination thereof. That is, the free ionomer 4 includes all ionomers that are not coated on the surface of the catalyst 2.

That is, according to the present disclosure, a catalyst layer 30, formed after the coating composition 31 is dried, includes a catalyst 2, a coating ionomer 3 disposed on the surface of the catalyst 2, and a free ionomer 4, which is not coated on the surface of the catalyst 2. The catalyst layer 30 includes a first layer, which abuts the polymer electrolyte membrane 50, and a second layer, which is disposed on the first layer. The first layer is an ionomer-rich layer 5 including the free ionomer 4.

The second layer may not include the free ionomer 4 at all, or may include the free ionomer 4 in a smaller amount per unit volume than the first layer, as illustrated in FIG. 2.

As previously described, the free ionomer 4 may include at least one of the first and second ionomers, for example, either the second ionomer alone or both the first ionomer and the second ionomer. That is, the free ionomer 4 may be mainly composed of the second ionomer added to the dispersed mixture. In the case in which the first ionomer that is not coated on the catalyst 2 is not removed from the dispersed mixture before the second ionomer is added to the dispersed mixture, however, the free ionomer 4 may further include the first ionomer that is not coated on the catalyst 2.

As previously, according to the present disclosure, at least some of the free ionomer 4 (i.e. the second ionomer) may be a different kind of ionomer from the coating ionomer 3 (i.e. the first ionomer).

The ionomer-rich layer 5, which is formed utilizing the free ionomer 4, may improve interfacial binding strength between the polymer electrolyte membrane 50 and the catalyst layer 30, and may improve mass transfer and performance.

Specifically, in the case in which direct coating is applied, an ionomer added in a larger amount than the catalyst or an ionomer that does not contact the catalyst, which becomes an issue in a conventional method of performing coating and transfer operations using a decal film, i.e. a free ionomer, may be utilized. That is, in a decal method, a material is coated on the decal film and is then transferred to the polymer electrolyte membrane, whereby an ionomer excess region due to the free ionomer is raised upwards to impede mass transfer, and a relatively small ionomer portion is located on the polymer electrolyte membrane and thus interfacial binding strength is reduced. However, in the present disclosure, in which the coating composition is coated on the polymer electrolyte membrane 50 using the direct coating method, the free ionomer 4 is precipitated toward the polymer electrolyte membrane 50 in order to form the ionomer-rich layer 5, whereby the interfacial binding strength between the catalyst layer 30 and the polymer electrolyte membrane 50 may be improved.

Also, in the decal method, it is not easy to form the ionomer-rich layer 5 according to the present disclosure, since it is required to uniformly apply the ionomer in the catalyst layer.

The thickness of the ionomer-rich layer 5 may be 30 nm to 1500 nm, specifically 50 nm to 1300 nm. In the case in which the size of the ionomer-rich layer 5 is less than 30 nm, it may not be possible to improve interfacial binding strength or ion conductivity. In the case in which the size of the ionomer-rich layer 5 is greater than 1500 nm, mass transfer may be impeded, whereby performance may be deteriorated.

In the case in which the direct coating method is used, the ionomer-rich layer 5 may be formed without a separate process, whereby it is possible to improve interfacial binding strength between the polymer electrolyte membrane 50 and the catalyst layer 30, and to improve mass transfer and performance.

The catalyst layer 30 may include 0.2 wt % to 5 wt % of the free ionomer 4, more specifically 0.5 wt % to 4 wt % of the free ionomer 4, based on the total weight of the catalyst layer 30. In the case in which the content of the free ionomer 4 is less than 0.2 wt % of the total weight of the catalyst layer 30, the improvement effect may be insignificant. In the case in which the content of the free ionomer 4 is greater than 5 wt % of the total weight of the catalyst layer 30, mass transfer may be impeded.

The content of the free ionomer 4 in the catalyst layer 30 may be measured by centrifuging the catalyst layer 30 at 20,000 rpm or higher and separating the free ionomer 4, which is not coated on the catalyst 2, from the catalyst 2 on which the ionomer is coated.

The size of the free ionomer 4 may be 10 nm to 1500 nm, more specifically 30 nm to 800 nm. In the case in which the size of the free ionomer 4 deviates from the above range, mass transfer may be impeded, or it may be difficult to adjust the position at which the ionomer-rich layer 5 is generated.

As previously described, the free ionomer 4 may also be present between the catalyst components 2 on the ionomer-rich layer 3, thereby serving to aid ion transfer.

The free ionomer 4 may have any one selected from the group consisting of a spherical shape, an ellipsoidal shape, a stick shape, and a coil shape. Particularly, in the case in which the free ionomer 4 has an ellipsoidal shape and/or a stick shape, the effect of improving mass transfer may be further increased.

The ionomer-rich layer 3 may further include at least one functional additive selected from the group consisting of a radical scavenger, an ionic conductor, an oxygen evolution reaction (OER) catalyst, and a gas barrier particle. The functional additive may be present in the free ionomer 4 in the ionomer-rich layer 3.

The functional additive has been described previously in connection with the method of manufacturing the membrane-electrode assembly, and therefore a duplicate description thereof will be omitted.

Figure 3:
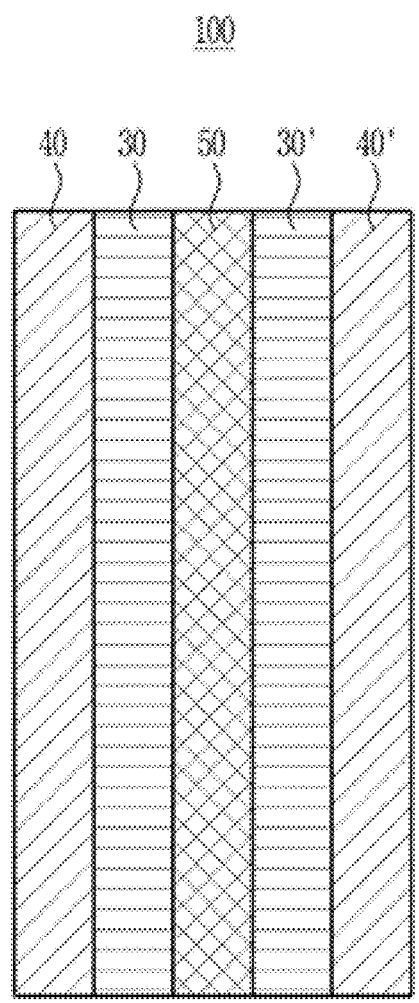
FIG. 3 is a sectional view schematically showing a membrane-electrode assembly according to an embodiment of the present disclosure.

FIG. 3 is a sectional view schematically showing a membrane-electrode assembly according to an embodiment of the present disclosure.

Referring to FIG. 3, the membrane-electrode assembly 100 according to the embodiment of the present disclosure includes a polymer electrolyte membrane 50, a first catalyst layer 30 disposed on one surface of the polymer electrolyte membrane 50, a first gas diffusion layer 40 disposed on the first catalyst layer 30, a second catalyst layer 30' disposed on the other surface of the polymer electrolyte membrane 50, and a second gas diffusion layer 40' disposed on the second catalyst layer 30'. The membrane-electrode assembly 100 may further include a microporous layer (not shown) disposed between the first catalyst layer 30 and the first gas diffusion layer 40 and/or between the second catalyst layer 30' and the second gas diffusion layer 40', wherein the microporous layer includes conductive microparticles, such as carbon powder or carbon black, for easy mass diffusion at the first gas diffusion layer 40 and/or the second gas diffusion layer 40'

In the membrane-electrode assembly 100, one of the first and second catalyst layers 30 and 30' functions as an anode electrode for receiving hydrogen gas and generating protons and electrons from the received hydrogen gas, and the other functions as a cathode electrode for receiving the protons and the electrons from the polymer electrolyte membrane 50 and an external circuit (not shown), reducing oxygen gas supplied from the outside using the received protons and electrons, and generating water.

Each of the first and second catalyst layers 30 and 30' is identical to the catalyst layer 30 described previously with reference to FIG. 2, and a duplicate description thereof will be omitted.

In order to smoothly supply hydrogen or oxygen, a porous conductive substrate may be used as each of the first and second gas diffusion layers 40 and 40'. In a representative example, carbon paper, carbon cloth, carbon felt, or metal cloth (a porous film made of fibrous metal cloth or a metal film formed on the surface of cloth made of polymer fiber) may be used. However, the present disclosure is not limited thereto. In addition, preferably, a fluorine-based resin that has undergone water-repellency treatment is used as each of the first and second gas diffusion layers 40 and 40', since it is possible to prevent reactant diffusion efficiency from being reduced by water generated during operation of the fuel cell.

Polytetrafluoroethylene, polyvinylidene fluoride, polyhexafluoropropylene, polyperfluoroalkyl vinyl ether, polyperfluorosulfonylfluoride alkoxy vinyl ether, fluorinated ethylene propylene, polychlorotrifluoroethylene, or a copolymer thereof may be used as the fluorine-based resin.

A fuel cell according to a further embodiment of the present disclosure may include the membrane-electrode assembly 100.

Figure 4:
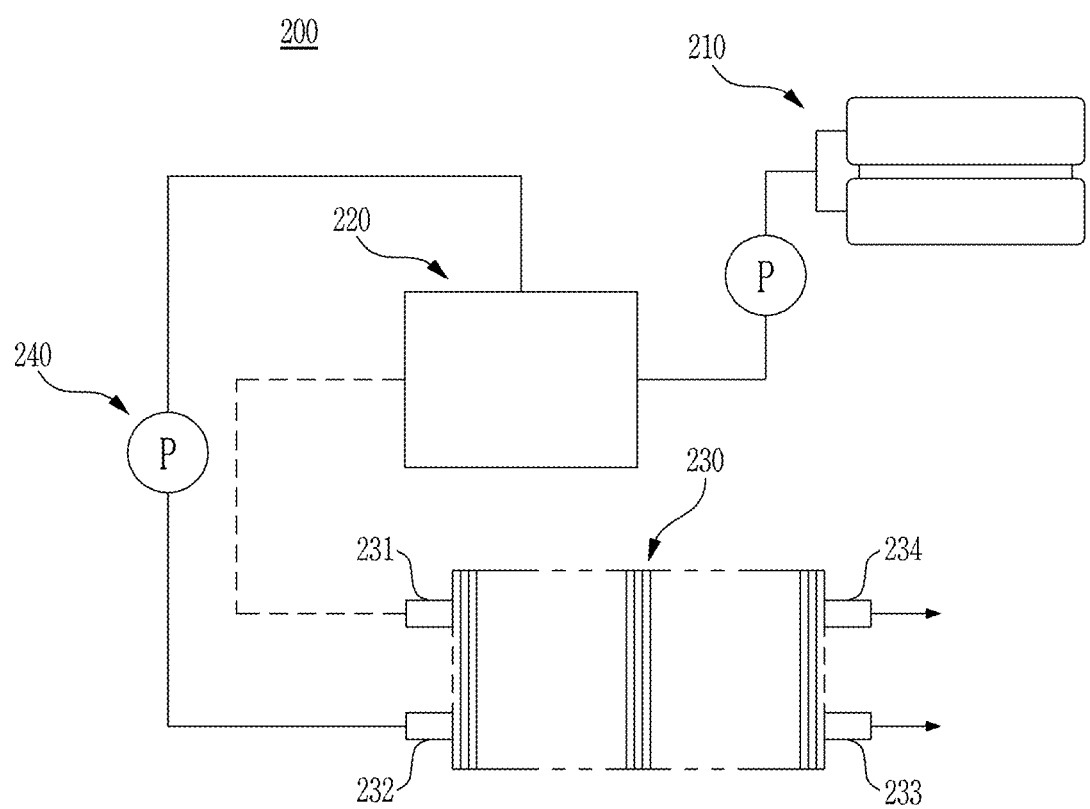
FIG. 4 is a schematic view showing the overall construction of a fuel cell according to another embodiment of the present disclosure.

FIG. 4 is a schematic view showing the overall construction of the fuel cell.

Referring to FIG. 4, the fuel cell 200 includes a fuel supply unit 210 for supplying a mixed fuel including fuel and water mixed with each other, a reforming unit 220 for reforming the mixed fuel to generate a reformed gas including hydrogen gas, a stack 230 for inducing electrochemical reaction between the reformed gas including the hydrogen gas, supplied from the reforming unit 220, and an oxidant to generate electrical energy, and an oxidant supply unit 240 for supplying the oxidant to the reforming unit 220 and to the stack 230.

The stack 230 includes a plurality of unit cells for inducing oxidation/reduction reaction between the reformed gas including the hydrogen gas, supplied from the reforming unit 220, and the oxidant, supplied from the oxidant supply unit 240, to generate electrical energy.

Each of the unit cells, which is an independent cell capable of generating electricity, includes the membrane-electrode assembly 100 for inducing oxidation/reduction reaction between a reformed gas including hydrogen gas and oxygen in an oxidant, and a separator (which is also called a bipolar plate; hereinafter referred to as a "separator") for supplying the reformed gas including the hydrogen gas and the oxidant to the membrane-electrode assembly 100. The separators are disposed at opposite sides of each of the membrane-electrode assemblies in the state in which the membrane-electrode assembly 100 is located between the separators. The separators disposed at the outermost sides of the stack may be specifically referred to as end plates.

One of the end plates is provided with a first supply pipe 231 for injecting reformed gas including hydrogen gas, supplied from the reforming unit 220, and a second supply pipe 232 for injecting oxygen gas, and the other end plate is provided with a first discharge pipe 233 for discharging the reformed gas including the remaining unreacted hydrogen gas in the unit cells to the outside and a second discharge pipe 234 for discharging the remaining unreacted oxidant in the unit cells to the outside.

Hereinafter, concrete examples of the present disclosure will be set forth. However, the following examples are given merely to concretely illustrate or describe the present disclosure, and the present disclosure is not limited thereto. In addition, content that is not described herein may be sufficiently technically inferred by those skilled in the art to which the present disclosure pertains, and therefore a description thereof will be omitted.

Manufacturing Example: Manufacture of Membrane-Electrode Assembly

Example 1: Catalyst Layer Including Free Ionomer Having Adjusted Shape and Size 1 g of a commercial Pt/C catalyst from Tanaka Company was put into a reaction vessel, and was then wetted with water. 3.6 g of a solution including an amorphous first ionomer (10 wt %) and 40 g of an alcohol-based mixed solvent were poured into the reaction vessel, and were then dispersed using a homogenizer and a nano disperser in order to prepare a dispersed mixture. As the result of the dispersion process, the first ionomer was coated on the surface of the catalyst.

0.5 g of a solution including a second ionomer having a spherical shape and a size of 100 to 300 nm (10 wt %) was added to the dispersed mixture, and was then dispersed at room temperature (20° C.) using the homogenizer and the nano disperser in order to prepare a coating composition. The coating composition included 25.5 wt % of the first ionomer and 3.5 wt % of the second ionomer based on the total weight thereof.

A protective film was separated from one surface of a polymer electrolyte membrane, and then a masking film was attached to the polymer electrolyte membrane.

The coating composition was directly coated on the one surface of the polymer electrolyte membrane using a slot die so as to have a coating thickness of 50 μm, and was then dried at a temperature of 90° C. for 3 minutes using hot air in order to form a first catalyst layer.

The masking film was separated from the polymer electrolyte membrane, and then the surface of the polymer electrolyte membrane on which the catalyst layer was formed was protected using protective paper. Subsequently, a protective film was separated from the other surface of the polymer electrolyte membrane, and then a masking film was attached to the polymer electrolyte membrane.

The coating composition was directly coated on the other surface of the polymer electrolyte membrane using the slot die so as to have a coating thickness of 30 μm, and was then dried at a temperature of 90° C. for 3 minutes using hot air in order to form a second catalyst layer.

The masking film was separated from the polymer electrolyte membrane in order to obtain a membrane-electrode assembly.

Example 2: Catalyst Layer Including Free Ionomer Different from First Ionomer 1 g of a commercial Pt/C catalyst from Tanaka Company was put into a reaction vessel, and was then wetted with water. 3.6 g of a solution including a first ionomer having an equivalent weight (EW) of 1100 g/eq (10 wt %) and 40 g of an alcohol-based mixed solvent were poured into the reaction vessel, and were then dispersed using the homogenizer and the nano disperser in order to prepare a dispersed mixture. As the result of the dispersion process, the first ionomer was coated on the surface of the catalyst.

0.5 g of a solution including a second ionomer having an equivalent weight (EW) of 800 g/eq (10 wt %) was added to the dispersed mixture, and was then dispersed at room temperature (20° C.) using the homogenizer and the nano disperser in order to prepare a coating composition. The coating composition included 25.5 wt % of the first ionomer and 3.5 wt % of the second ionomer based on the total weight thereof.

A membrane-electrode assembly was obtained in the same manner as in Example 1, except that the coating composition prepared as above was used.

Each of first and second catalyst layers of the membrane-electrode assembly thus formed included an ionomer-rich layer located on the side thereof at which the catalyst layer abutted the polymer electrolyte membrane and including a free ionomer, and the thickness of the ionomer-rich layer was 30 nm to 1500 nm.

Example 3: Catalyst Layer Including Functional Free Ionomer 1 g of a commercial Pt/C catalyst from Tanaka Company was put into a reaction vessel, and was then wetted with water. 3.6 g of a solution including a first ionomer having an equivalent weight (EW) of 1100 g/eq (10 wt %) and 40 g of an alcohol-based mixed solvent were poured into the reaction vessel, and were then dispersed using the homogenizer and the nano disperser in order to prepare a dispersed mixture. As the result of the dispersion process, the first ionomer was coated on the surface of the catalyst.

0.5 g of a solution including a second ionomer having an equivalent weight (EW) of 800 g/eq (10 wt %) and 0.03 g of an Mn-based radical scavenger, $MnO_2$, were added to the dispersed mixture, and were then dispersed using the homogenizer and the nano disperser in order to prepare a coating composition. The coating composition included 25.5 wt % of the first ionomer and 3.5 wt % of the second ionomer based on the total weight thereof.

A membrane-electrode assembly was obtained in the same manner as in Example 1, except that the coating composition prepared as above was used.

Each of first and second catalyst layers of the membrane-electrode assembly thus formed included an ionomer-rich layer located on the side thereof at which the catalyst layer abutted the polymer electrolyte membrane and including a free ionomer, and the thickness of the ionomer-rich layer was 30 nm to 1500 nm.

Comparative Example 1

A membrane-electrode assembly was obtained in the same manner as in Example 1, except that a coating composition was prepared without adding the second ionomer to the dispersed mixture, unlike Example 1.

Experimental Example 1: Confirmation of Formation of Ionomer-Rich Layer

Figure 5:
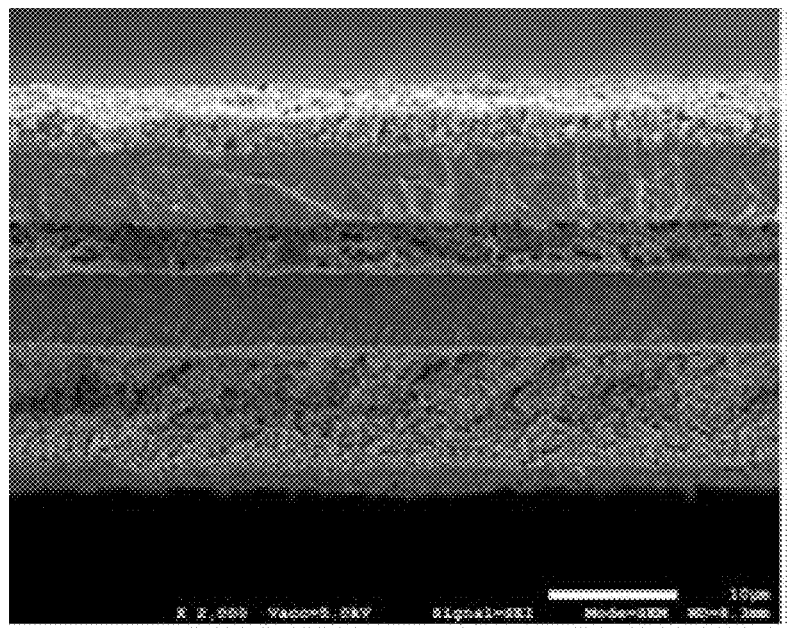
FIG. 5 is a scanning electron micrograph showing the entirety of a membrane-electrode assembly manufactured according to Example 1 of the present disclosure.
Figure 6:
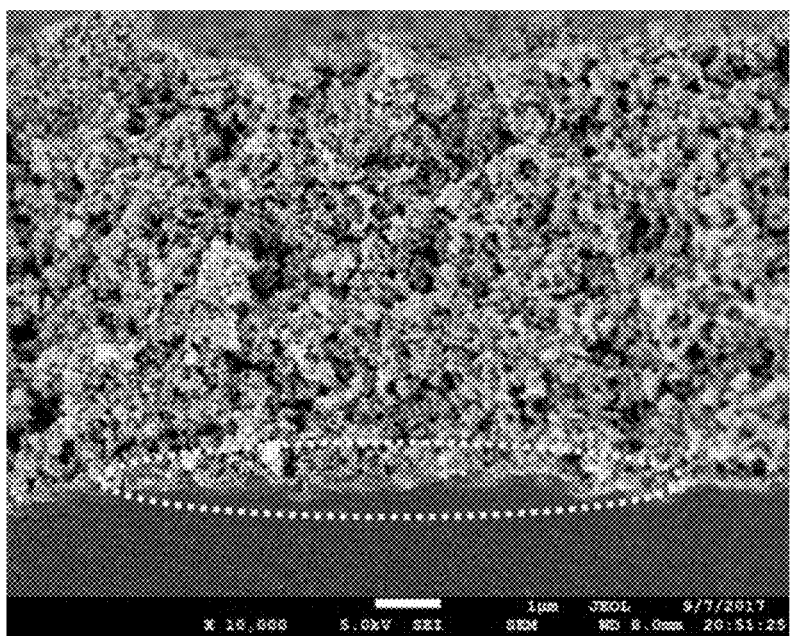
FIG. 6 is a scanning electron micrograph showing a catalyst layer formed according to Example 1 of the present disclosure.

The section of the membrane-electrode assembly manufactured according to Example 1 was observed using a scanning electron microscope, and the results of observation are shown in FIGS. 5 and 6. FIG. 5 is a scanning electron micrograph showing the entirety of the membrane-electrode assembly manufactured according to Example 1, and FIG. 6 is a scanning electron micrograph showing the catalyst layer formed according to Example 1. In FIG. 6, the yellow circle indicates an ionomer-rich layer.

Referring to FIGS. 5 and 6, it can be confirmed that the catalyst layer includes an ionomer-rich layer at the side thereof at which the catalyst layer abuts the polymer electrolyte membrane. It can be confirmed that the thickness of the ionomer-rich layer is 30 nm to 1500 nm.

Figure 7:
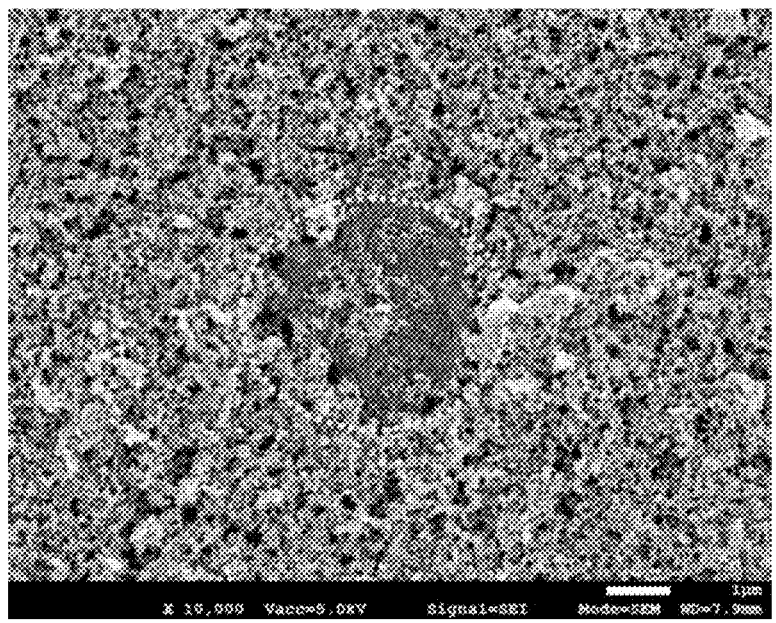
FIGS. 7 to 9 are scanning electron micrographs showing the formation of an ionomer-rich layer in Experimental Example 2 of the present disclosure.
Figure 8:
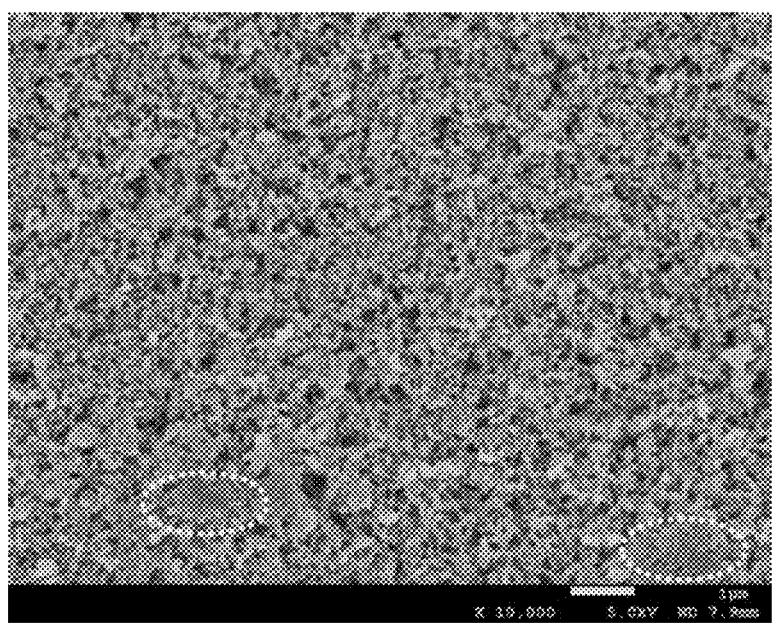
Figure 9:
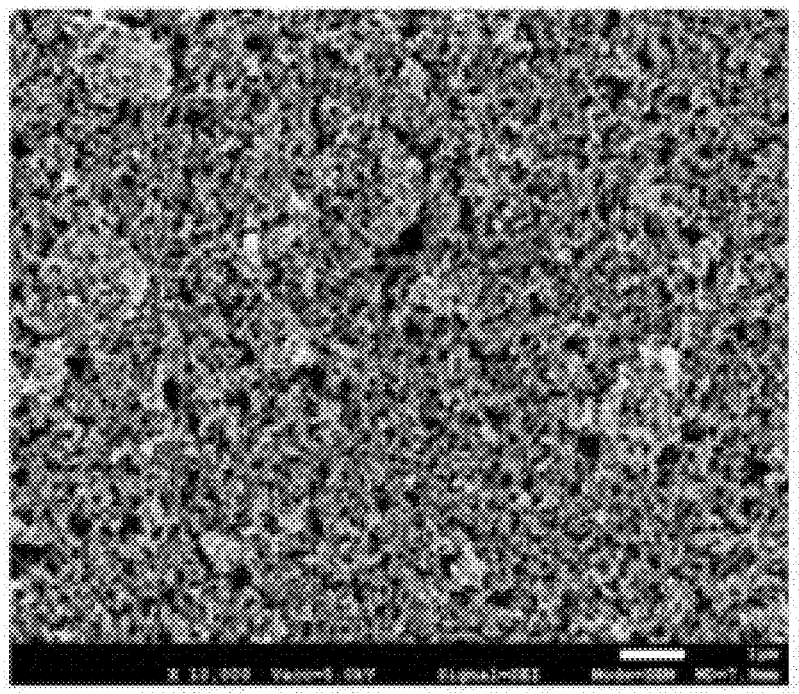

Experimental Example 2: Confirmation of Formation of Ionomer-Rich Layer Depending on Content of Second Ionomer Coating compositions were prepared in the same manner as in Example 1, except that the content of the second ionomer contained in each of the coating compositions was wt %, 1 wt %, and 0.1 wt %, and then decal films were coated and dried coating compositions in the same manner as in Example 1 in order to form catalyst layers. Subsequently, the catalyst layers were separated from the decal films, and were observed using a scanning electron microscope. The results of observation are shown in FIGS. 7 to 9. FIG. 7 shows the case in which the content of the second ionomer is 8 wt %, FIG. 8 shows the case in which the content of the second ionomer is 1 wt %, and FIG. 9 shows the case in which the content of the second ionomer is 0.1 wt %. In FIGS. 7 and 8, the yellow circles indicate ionomer-rich layers.

Referring to FIGS. 7 to 9, it can be seen that it is appropriate for the content of the second ionomer to be 0.2 wt % to 7 wt %, that, in the case in which the content of the second ionomer is greater than 7 wt %, an ionomer-rich area is increased, whereby performance may be deteriorated or activation may become slow, and that, in the case in which the content of the second ionomer is less than 0.2 wt %, the effect of improving interfacial binding strength may not be achieved.

Figure 10:
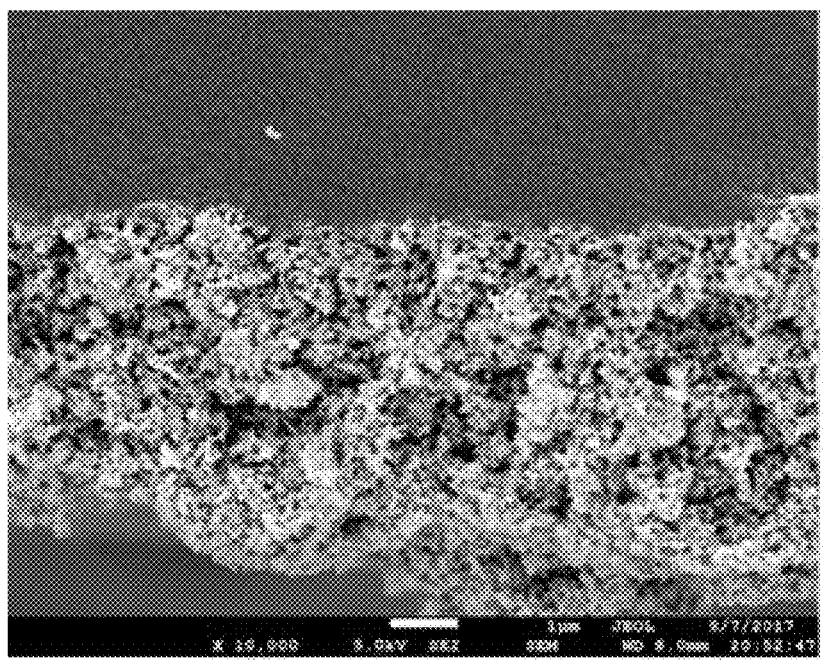
FIGS. 10 and 11 are scanning electron micrographs showing the section of a membrane-electrode assembly after performance testing in Experimental Example 3 of the present disclosure.
Figure 11:
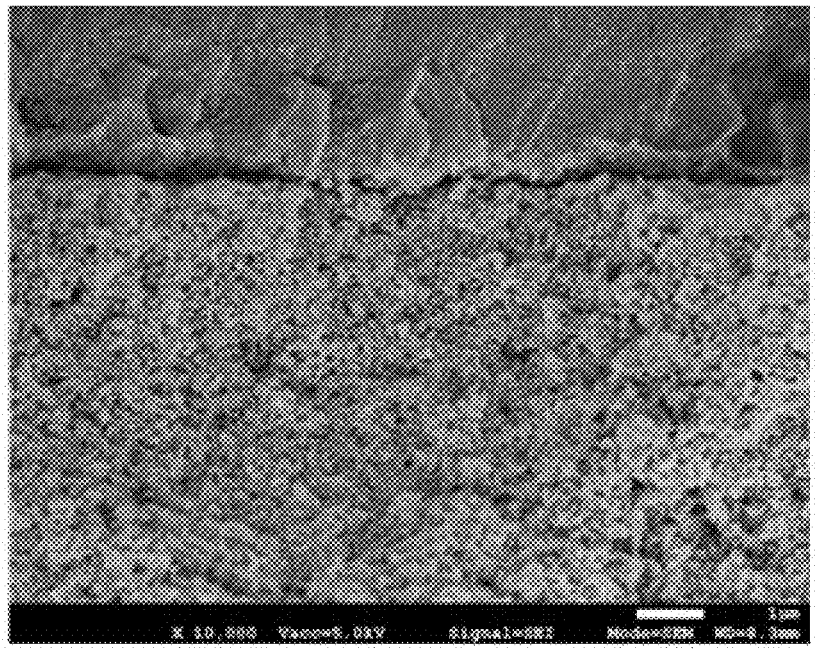

Experimental Example 3: Evaluation of Interfacial Binding Strength of Membrane-Electrode Assembly Through Performance Testing The membrane-electrode assemblies manufactured according to Example 1 and Comparative Example 1 were wetted and dried several cycles, and, after the wetting and drying cycles, the sections of the membrane-electrode assemblies manufactured according to Example 1 and Comparative Example 1 were observed using a scanning electron microscope. The results of observation are shown in FIGS. 10 and 11. FIG. is a scanning electron micrograph of the membrane-electrode assembly manufactured according to Example 1 after performance testing, and FIG. 11 is a scanning electron micrograph of the membrane-electrode assembly manufactured according to Comparative Example 1 after performance testing.

Referring to FIGS. 10 and 11, it can be confirmed that the membrane-electrode assembly manufactured according to Example 1 has higher interfacial binding strength between the catalyst layer and the polymer electrolyte membrane than the membrane-electrode assembly manufactured according to Comparative Example 1. That is, it can be observed that the catalyst layer including the free ionomer maintained a stable interfacial state even after performance testing, whereas the catalyst layer including no free ionomer was separated from the polymer electrolyte membrane after performance testing.

Figure 12:
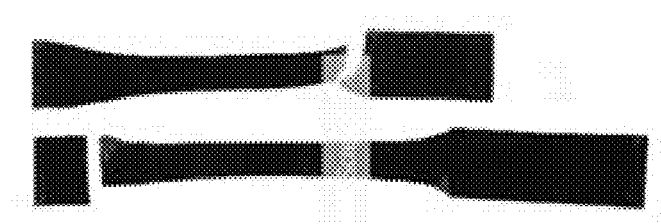
FIGS. 12 and 13 show samples before and after tensile testing in Experimental Example 3 of the present disclosure.
Figure 13:
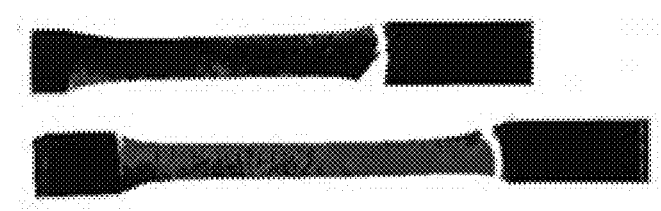

Experimental Example 4: Evaluation of Interfacial Binding Strength of Membrane-Electrode Assembly Through Tensile Testing The tensile properties of the membrane-electrode assemblies manufactured according to Example 1 and Comparative Example 1 were evaluated, and the results of evaluation are shown in FIGS. 12 and 13. FIG. 12 shows the results of evaluation of the tensile properties of the membrane-electrode assembly manufactured according to Example 1, and FIG. 13 shows the results of evaluation of the tensile properties of the membrane-electrode assembly manufactured according to Comparative Example 1. In each of FIGS. 12 and 13, the upper sample is a sample before tensile testing, the lower sample is a sample after tensile testing, and the portion discolored after testing indicates the portion at which the catalyst was separated from the polymer electrolyte membrane.

Referring to FIGS. 12 and 13, it can be confirmed that the catalyst layer including the free ionomer has higher interfacial binding strength with the polymer electrolyte membrane than the catalyst layer including no free ionomer. That is, the catalyst layer including the free ionomer maintained a stable interfacial state even after tensile testing and almost no separation of the catalyst was observed, whereas the catalyst layer including no free ionomer was separated from the polymer electrolyte membrane at the interface therebetween after tensile testing.

Experimental Example 5: Observation of Size of Free Ionomer

The hydrodynamic size of the free ionomer in the catalyst layer of the membrane-electrode assembly manufactured according to Example 1 was measured using a dynamic light scattering (DLS) method, and the results of measurement are shown in Table 1 below.

In Table 1 below, Sample 1 included 60 wt % of the alcohol-based mixed solvent, and Sample 2 included 90 wt % of the alcohol-based mixed solvent.

TABLE 1

|  | Rh/nm (Min viscosity) | Rh/nm (Max viscosity) | Range/nm (Min viscosity) | Range/nm (Max viscosity) |
| --- | --- | --- | --- | --- |
| Sample 1 | 245 | 122 | 36 | 18 |
| Sample 2 | 97 | 39 | 21 | 9 |

As can be seen from Table 1 above, it can be confirmed that the higher the content of the alcohol-based solvent included in the solution and the higher the viscosity of the solution, the smaller the hydrodynamic size (Rh/nm) of the free ionomer.

Range/nm indicates the viscosity range of the solution (which is marked as "width" on equipment).

It can be seen from the above experiments that it is possible to adjust the size of the free ionomer by adjusting the kind and content of the solvent. In addition, the fact that it is also possible to adjust the shape of the free ionomer by adjusting the kind and content of the solvent has been published through several theses and reports. In conclusion, it can be seen that it is possible to adjust the hydrodynamic size and shape of the free ionomer according to the present disclosure by adjusting the content, shape, size, and kind of the second ionomer through the composition of the solvent and the change of the manufacturing method in the case in which the second ionomer is added.

Experimental Example 6: Observation of Size and Shape of Ionomer-Rich Layer

Figure 14:
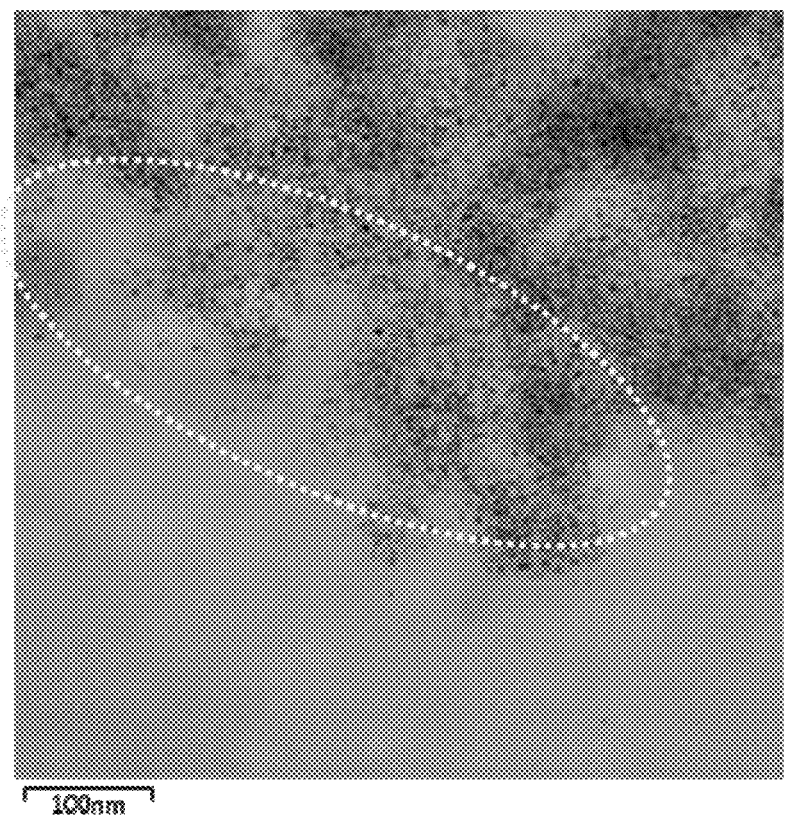
FIG. 14 is a scanning electron micrograph showing the section of a membrane-electrode assembly manufactured according to Example 3 of the present disclosure.

The section of the membrane-electrode assembly manufactured according to Example 3 was observed using a scanning electron microscope, and the results of observation are shown in FIG. 14. In FIG. 14, the yellow circle indicates an ionomer-rich layer, the portion above the yellow circle indicates the catalyst layer, and the portion below the yellow circle indicates the polymer electrolyte membrane.

Referring to FIG. 14, it can be confirmed that the ionomer-rich layer composed of the functional free ionomer including the Mn-based radical scavenger, $MnO_2$, is formed at the side at which the ionomer-rich layer abuts the polymer electrolyte membrane.

The ionomer-rich layer composed of the functional free ionomer may improve the resistance to hydrogen permeation and oxygen permeability of the membrane-electrode assembly.

The invention claimed is:

1. A method of manufacturing a membrane-electrode assembly, the method comprising:
   adding a catalyst and a first ionomer to a solvent;
   dispersing the catalyst and the first ionomer in the solvent in order to prepare a dispersed mixture, at least a portion of the first ionomer being coated on a surface of the catalyst;
   adding a second ionomer to the dispersed mixture;
   dispersing the second ionomer in the dispersed mixture in order to prepare a coating composition, at least a portion of the second ionomer existing as a free ionomer in the coating composition without being coated on the surface of the catalyst;
   directly coating the coating composition on at least one surface of a polymer electrolyte membrane; and
   driving the coating composition coated on the at least one surface of the polymer electrolyte membrane in order to form a catalyst layer,
   wherein, during the drying step, the free ionomer is precipitated toward the polymer electrolyte membrane such that the catalyst layer comprises a first layer abutting the polymer electrolyte membrane and a second layer on the first layer, the first layer being an ionomer-rich layer comprising the free ionomer.

2. The method according to claim 1, wherein the first and second ionomers are identical to or different from each other.

3. The method according to claim 2, wherein
   each of the first and second ionomers has an equivalent weight (EW) ranging from 600 g/eq to 1100 g/eq, and the equivalent weight of the first ionomer is different from the equivalent weight of the second ionomer.

4. The method according to claim 2, wherein
   each of the first and second ionomers is a fluorinated polymer comprising a fluorinated carbon backbone and a side chain expressed by Chemical Formula 1 below, and
   the first and second ionomers have different side-chain lengths (a+b), —$(OCF_2CFR_f)_a$—O—$(CF_2)_b$—X    [Chemical Formula 1]

(In Chemical Formula 1 above,
   $R_f$ is independently any one selected from the group consisting of F, Cl, and a perfluorinated alkyl group having 1 to 10 carbon atoms,
   X is an ion exchange group,
   a is an integer ranging from 0 to 3, and
   b is an integer ranging from 1 to 5).

5. The method according to claim 2, wherein
   the first ionomer is a first hydrocarbon-based ionomer,
   the second ionomer is a second hydrocarbon-based ionomer, and
   the first hydrocarbon-based ionomer is different from the second hydrocarbon-based ionomer.

6. The method according to claim 2, wherein one of the first and second ionomers is a fluorine-based ionomer, and the other is a hydrocarbon-based ionomer.

7. The method according to claim 1, wherein the second ionomer has a size ranging from 10 nm to 1500 nm.

8. The method according to claim 1, wherein the second ionomer has a shape selected from the group consisting of a spherical shape, an ellipsoidal shape, a stick shape, and a coil shape.

9. The method according to claim 1, wherein the coating composition is prepared by adding at least one functional additive, selected from a group consisting of a radical scavenger, an ionic conductor, an oxygen evolution reaction (OER) catalyst, and a gas barrier particle, to the dispersed mixture together with the second ionomer.

10. The method according to claim 1, wherein the coating composition comprises 20 wt % to 40 wt % of the first ionomer and 0.2 wt % to 7 wt % of the second ionomer based on a total weight of the coating composition.

11. The method according to claim 1, wherein the second ionomer is dispersed in the dispersed mixture at a temperature of 15° C. to 80° C.

12. The method according to claim 1, wherein the ionomer-rich layer has a thickness ranging from 30 nm to 1500 nm.

* * * * *